(12) United States Patent
Ahn

(10) Patent No.: US 6,691,585 B2
(45) Date of Patent: Feb. 17, 2004

(54) ANTHROPOMORPHIC DUMMY HEAD FOR USE IN VEHICLE CRASH TEST

(75) Inventor: Chang-Nam Ahn, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 158 days.

(21) Appl. No.: 10/004,809

(22) Filed: Dec. 7, 2001

(65) Prior Publication Data

US 2002/0083783 A1 Jul. 4, 2002

(30) Foreign Application Priority Data

Dec. 11, 2000 (KR) .................................. 2000-75104

(51) Int. Cl.[7] .................................................. G01N 3/30
(52) U.S. Cl. ...................................................... 73/866.4
(58) Field of Search ........................... 73/865.1, 865.3, 73/865.4, 866.4, 862.581, 862.584

(56) References Cited

U.S. PATENT DOCUMENTS 4,198,857 A * 4/1980 Preux ..................... 73/862.584
4,558,599 A * 12/1985 Sachs ..................... 73/862.584
4,691,556 A * 9/1987 Mellander et al. ......... 73/866.4

* cited by examiner

Primary Examiner—Robert Raevis
(74) Attorney, Agent, or Firm—Antonelli, Terry, Stout & Kraus, LLP

(57) ABSTRACT

An anthropomorphic dummy head for use in a vehicle crash test is provided that includes a skull member forming a shape of the dummy head and an eye damage measuring part for estimating damage to an eye, wherein the eye damage measuring part comprises a housing disposed inside the skull member, the housing being closed and filled with compressible gas; a one-side-open cylinder that is fixed to a circumference of the housing; a piston that is slidably inserted into the one-side-open cylinder, one end of which is provided with a plate onto which an impact from an outside of the housing is transmitted; and a pressure sensor detecting pressure inside the housing.

5 Claims, 4 Drawing Sheets

ANTHROPOMORPHIC DUMMY HEAD FOR USE IN VEHICLE CRASH TEST

BACKGROUND OF THE INVENTION (a) Field of the Invention

The present invention relates generally to an anthropomorphic dummy head, and more specifically, to an anthropomorphic dummy head for use in a vehicle crash test for evaluating damage to an eye as a result of deployment of an airbag and subsequent impact of the head of the crash test dummy with the same.

(b) Description of the Related Art

Anthropomorphic dummies have long been used in research directed toward reducing injuries in vehicle crashes, and the dummies are manufactured in such a way that they are similar in appearance and weight and have the same center of gravity as a human body.

A dummy head corresponding to a head of a human body is very important in such research, and many countries have stringent regulations and conditions for head impact tests that must be satisfied.

To satisfy the many conditions, the dummy head 50, as shown in FIGS. 5 and 6, comprises a front half-skull member 51 and a rear half-skull member 53. These two skull members 51 and 53 are coupled together with a bolt. Then, around the coupled skull members 51 and 53, skin 55 is formed using silicon through a molding method.

The dummy head is further provided with an acceleration sensor 59 mounted on a bracket 57, at a point of COG (Center of Gravity), and using the acceleration sensor 59, the dummy head impact can be measured.

However, the dummy head for vehicle crash testing according to the prior art cannot obtain accurate measurements of damage to eyes with the deployment of the airbag caused by the vehicle crash.

SUMMARY OF THE INVENTION

The present invention has been made in an effort to solve the above problem. It is an object of the present invention to provide an anthropomorphic dummy head for use in a vehicle crash test in which damage to an eye as a result of deployment of the airbag can be precisely evaluated.

To achieve the above object, the anthropomorphic dummy head according to the present invention comprises:

a skull member forming a shape of the dummy head; and an eye damage measuring part for estimating damage to an eye, wherein the eye damage measuring part comprises:

a housing disposed inside the skull member, the housing being closed and being filled with compressible gas;

a one-side-open cylinder that is fixed to a circumference of the housing;

a piston that is slidably inserted into the one-side-open cylinder, one end of which is provided with a plate onto which an impact from an outside of the housing is transmitted; and a pressure sensor detecting pressure inside the housing.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Hereinafter, a preferred embodiment of the present invention will be described in detail with reference to the accompanying drawings.

Figure 1:
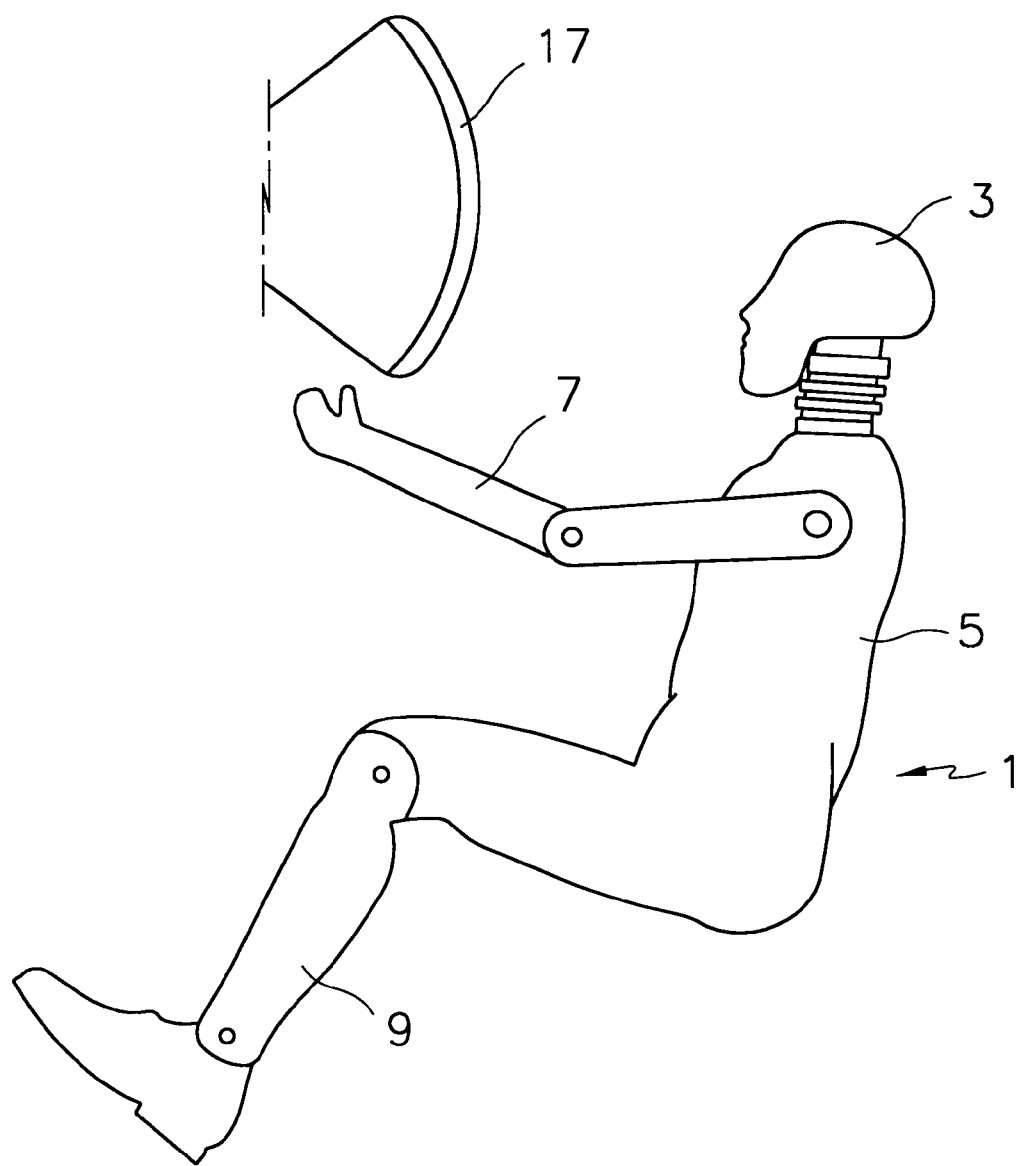
FIG. 1 is a schematic perspective view of the anthropomorphic dummy to which the anthropomorphic dummy head according to the present invention is applied.

FIG. 1 is a schematic perspective view of the anthropomorphic dummy to which the anthropomorphic dummy head according to the present invention is applied.

As shown in FIG. 1, the anthropomorphic dummy 1 comprises a dummy head 3, a body 5, an arm 7 and a leg 9, and it is mounted on a crash test vehicle such that an impact on the human body can be measured.

Figure 2:
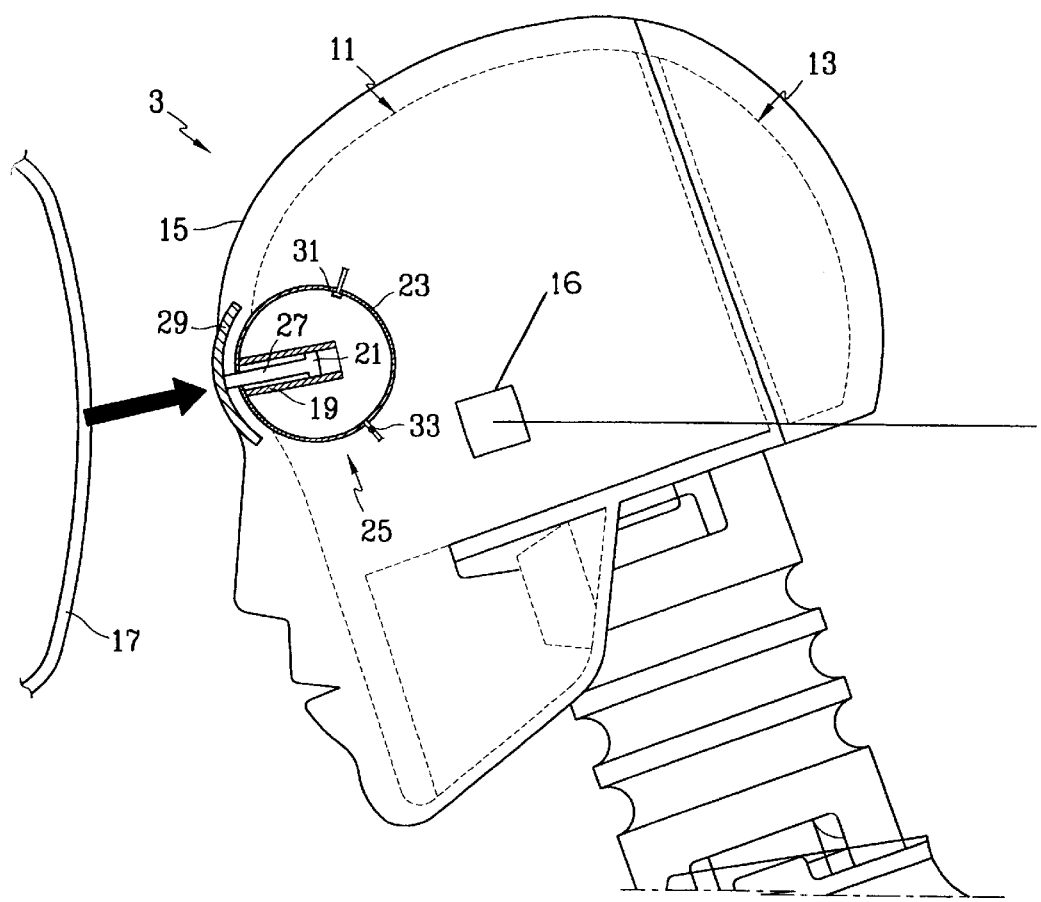
FIG. 2 is a side view of the anthropomorphic dummy head according to the preferred embodiment of the present invention.
Figure 3:
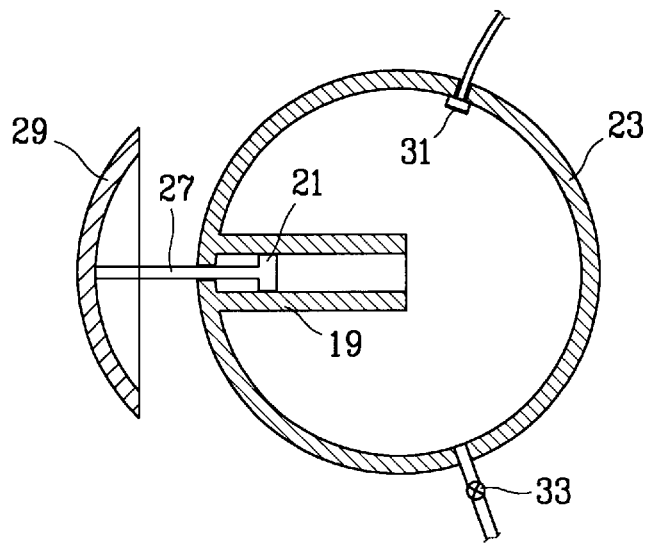
FIGS. 3 and 4 respectively show the states before and after the operation of the eye damage measuring part of the anthropomorphic dummy head according to the preferred embodiment of the present invention.

The anthropomorphic dummy head 3, referring to FIG. 2, comprises a skull member, the skull member including a front half-skull member 11 and a rear half-skull member 13. These two skull members 11 and 13 are coupled together with a bolt. Around the coupled skull members 11 and 13, skin 15 is formed using silicon through a molding method.

The dummy head 3 is further provided with an acceleration sensor 16 mounted on a bracket, at a point of COG (Center of Gravity), and using the acceleration sensor 16, the dummy head impact can be measured.

Also, an eye damage measuring part 25 is provided inside the front half-skull 11. The eye damage measuring part 25 is arranged in such a way that an impact on the eye from the expanding airbag can be measured.

The eye damage measuring part 25 comprises an eyeball-shaped closed housing 23 that is filled with compressible gas, a one-side-open cylinder 19 and a piston 27 that is slidably inserted into the cylinder, one end of which is provided with a rounded plate 29 that is exposed outside the head 3 and receives the impact from the airbag 17.

If the airbag 17 and the rounded plate 29 collide, the impact is transmitted to the piston 27 and the gas in the housing 23 is compressed.

Furthermore, the housing 23 comprises a pressure sensor 31 detecting a pressure inside the housing 23 and a pressure-regulating valve 33 that regulates the pressure inside the housing 23. By filling or discharging the compressible gas through the pressure-regulating valve 33 before the crash test, the pressure inside the housing 23 is regulated to a certain level, i.e., the approximate pressure of a real human eye.

Figure 4:
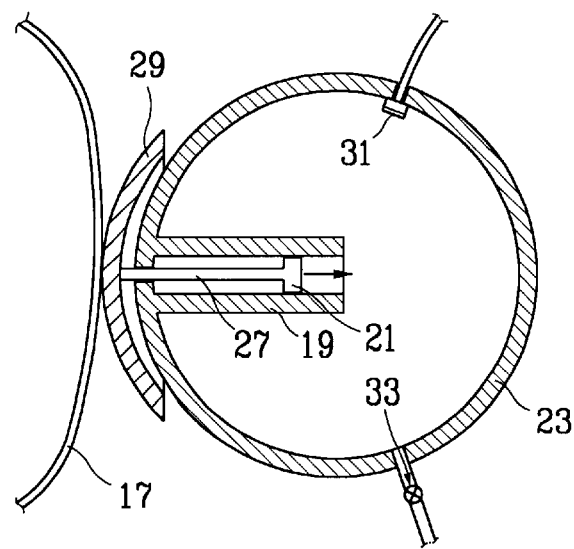
Figure 5:
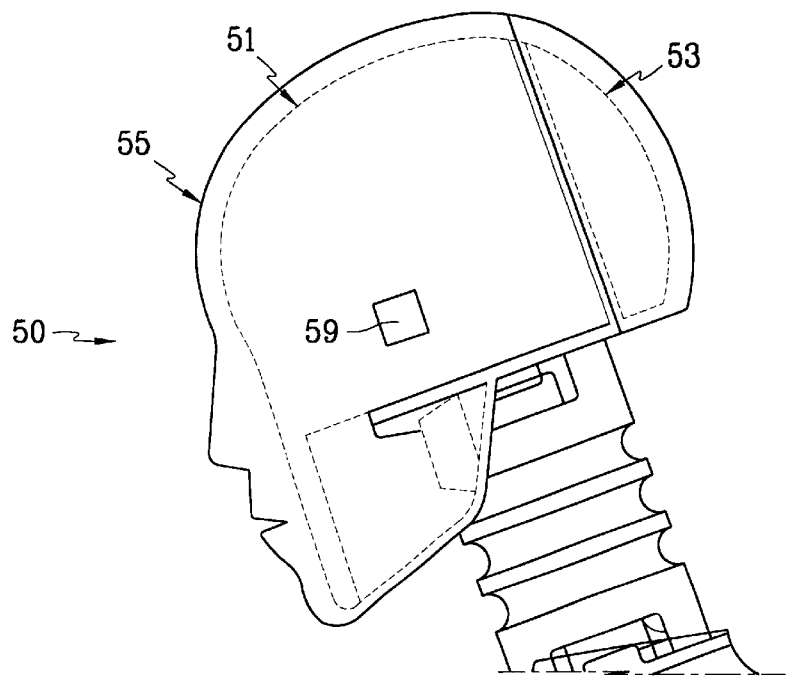
FIG. 5 is a side view of the anthropomorphic dummy for use in a vehicle crash test according to the prior art.
Figure 6:
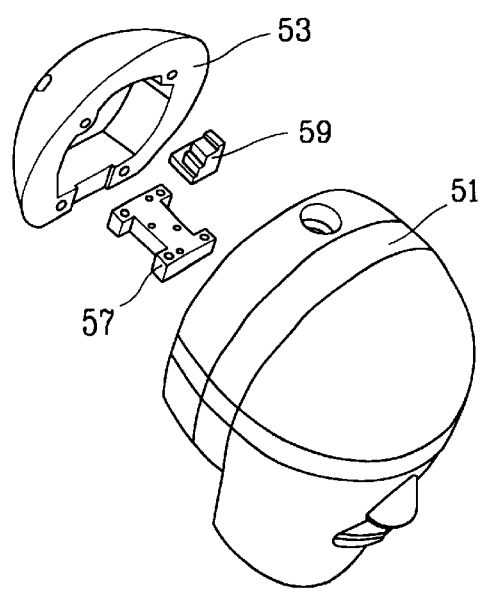
FIG. 6 is an exploded perspective view of the anthropomorphic dummy for use in a vehicle crash test according to the prior art.

If the airbag 17 is deployed in the course of the vehicle crash test and impacts the dummy head 3, the rounded plate 29 is forced to move in a backward direction (rightward in FIG. 2) to a position as shown in FIG. 4. This causes the inside volume of the housing 23 to decrease so that the pressure inside the housing 23 increases. The increased pressure is detected by the pressure sensor 31, and because the pressure detected by the pressure sensor is directly related to the damage to eyes, the damage level can be derived using the pressure, and a more perfect dummy can be manufactured.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An anthropomorphic dummy head for use in a vehicle crash test comprising:

a skull member forming a shape of a dummy head;

an eye damage measuring part for estimating damage to an eye, wherein the eye damage measure part comprises:

a housing disposed inside the skull member, the housing being filled with compressible gas;

a one-side-open cylinder that is fixed to a circumference of the housing;

a piston that is slidably inserted into the one-side-open cylinder, one end of which is provided with a plate onto which an impact from an outside of the housing is transmitted; and a pressure sensor detecting pressure inside the housing.

2. The anthropomorphic dummy head of claim 1 further comprising an acceleration sensor detecting an acceleration of the dummy head during the vehicle crash test.

3. The anthropomorphic dummy head of claim 1 wherein the eye damage measuring part further comprises a pressure-regulating valve that regulates pressure inside the housing.

4. The anthropomorphic dummy head of claim 1 wherein the housing is eyeball-shaped.

5. The anthropomorphic dummy head of claim 1 wherein the plate of the piston is shaped as a round arch.

* * * * *